(12) United States Patent
Brown et al.

(10) Patent No.: US 6,531,240 B1
(45) Date of Patent: Mar. 11, 2003

(54) GAS DIFFUSION SUBSTRATES

(75) Inventors: Karen Leanne Brown, Reading (GB); John Malcolm Gascoyne, Bucks (GB); Thomas Robertson Ralph, Reading (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 09/936,547

(22) PCT Filed: Feb. 9, 2000

(86) PCT No.: PCT/GB00/00382

§ 371 (c)(1),
(2), (4) Date: Sep. 14, 2001

(87) PCT Pub. No.: WO00/55933

PCT Pub. Date: Sep. 21, 2000

(30) Foreign Application Priority Data

Mar. 16, 1999 (GB) ................................. 9905950

(51) Int. Cl.⁷ ................................................. H01M 4/86
(52) U.S. Cl. .............................. 429/44; 429/40; 429/42; 429/45; 429/30; 429/33; 204/283
(58) Field of Search .......................... 204/283; 429/40, 429/44, 45, 42, 30, 33

(56) References Cited

U.S. PATENT DOCUMENTS

| | | | |
|---|---|---|---|
| 4,775,551 A | 10/1988 | Bachot et al. ............. | 427/58 |
| 5,863,673 A | * 1/1999 | Campbell et al. .......... | 429/44 |
| 6,060,190 A | * 5/2000 | Campbell et al. .......... | 429/40 |
| 6,103,077 A | * 8/2000 | DeMarinis et al. ........ | 429/40 |
| 6,127,059 A | * 10/2000 | Kato ........................... | 429/40 |

FOREIGN PATENT DOCUMENTS

| | | |
|---|---|---|
| EP | 0 731 520 | 9/1996 |
| EP | 0 791 974 | 8/1997 |
| EP | 0 797 265 | 9/1997 |
| EP | 0 872 907 | 10/1998 |
| EP | 0 875 524 | 11/1998 |
| JP | 62-232858 | 10/1987 |
| JP | 63-086883 | 4/1988 |
| JP | 01-041171 | 2/1989 |
| WO | 98/27606 | 6/1998 |

OTHER PUBLICATIONS

Sergei Gamburzev, Christopher Boyer, and A. John Appleby, "Low platinum loading, lightweight PEM fuel cells," *Fuel Cells Bulletin*, No. 6, Mar. 1999, pp. 6–8.
British Search Report dated Apr. 21, 1999.
International Search Report dated Jun. 19, 2000.

* cited by examiner

Primary Examiner—Bruce F. Bell
(74) Attorney, Agent, or Firm—RatnerPrestia

(57) ABSTRACT

A novel gas diffusion substrate comprising a porous structure and a filler material, characterised in that the filler material comprises a base filler material which is electrically conducting and carbonaceous and one or more modifier materials which ate hydrophilic in nature relative to the base filler material; a porous gas diffusion electrode comprising said substrate and the use of said substrate or electrode in a fuel cell is disclosed.

23 Claims, 1 Drawing Sheet

GAS DIFFUSION SUBSTRATES

The present invention relates to a novel porous gas diffusion substrate and a porous gas diffusion electrode which may have application in electrochemical devices, for use for example in a fuel cell, and a process for the manufacture of the substrate and electrode.

BACKGROUND OF THE INVENTION

Electrochemical cells invariably comprise at their fundamental level a solid or liquid electrolyte and two electrodes, the anode and cathode, at which the desired electrochemical reactions take place. Gas diffusion electrodes are employed in a range of electrochemical devices, in which a gaseous reactant and/or product has to be diffused into and/or out of one of the cell electrode structures. They are designed to optimise the contact between the reactant and the electrolyte to maximise the reaction rate. Electrocatalysts are often incorporated into gas diffusion electrode structures to increase the rates of the desired electrode reactions.

Gas diffusion electrodes are employed in many different electrochemical devices, including metal-air batteries, electrochemical gas sensors, electrosynthesis of useful chemical compounds, and in particular, fuel cells. Conventionally, gas diffusion electrodes comprise many components and are typically made up of one, two or even more layers of these components. Typically the gas diffusion electrode will comprise one or more electrocatalyst containing layers, which are supported onto a more rigid porous substrate layer.

A fuel cell is an energy conversion device that efficiently converts the stored chemical energy of its fuel into electrical energy by combining either hydrogen, stored as a gas, or methanol stored as a liquid or gas, with oxygen to generate electrical power. The hydrogen or methanol are oxidised at the anode and oxygen is reduced at the cathode. Both electrodes are of the gas diffusion type. The electrolyte has to be in contact with both electrodes and may be acidic or alkaline, liquid or solid, in nature. In proton exchange membrane fuel cells (PEMFC), the electrolyte is a solid proton-conducting polymer membrane, commonly based on perfluorosulphonic acid materials, and the combined structure formed from the membrane and the two gas diffusion electrodes is known as a membrane electrode assembly (MEA). Alternatively, the MEA may be formed from two porous gas diffusion substrates and a solid proton-conducting polymer membrane catalysed on both sides; or the MEA may be formed from one gas diffusion electrode and one gas diffusion substrate and a solid proton-conducting polymer catalysed on the side facing the gas diffusion substrate. The anode gas diffusion electrode or substrate is designed to be porous and allow the reactant hydrogen or methanol to enter from the face of the electrode or substrate exposed to the reactant fuel supply, and diffuse through the thickness of the electrode or substrate to the reaction sites which contain electrocatalysts, usually platinum metal based, to maximise the electrochemical oxidation of hydrogen or methanol. The anode is also designed to allow electrolyte to penetrate through the face of the electrode or substrate exposed to the electrolyte and to also contact the same reaction sites. With acidic electrolyte types the product of the anode reaction are protons and these can then be efficiently transported from the anode reaction sites through the electrolyte to the cathode gas diffusion electrode or substrate. The cathode is also designed to be porous and allow oxygen or air to enter the electrode or substrate and diffuse through to the reaction sites. Electrocatalysts are again commonly incorporated to maximise the rate of the reaction at the cathode reaction sites which combines the protons with oxygen to produce water. Product water then has to diffuse out of the cathode structure. The structure of the cathode has to be designed such that it enables the efficient removal of the product water. If water builds up in the cathode, it becomes more difficult for the reactant oxygen to diffuse to the reaction sites, and thus the performance of the fuel cell decreases. In the case of methanol fuelled PEMFCs, additional water is present due to the water contained in the methanol, which can be transported through the membrane from the anode to the cathode side. The increased quantity of water at the cathode requires removal. However, it is also the case with proton conducting membrane electrolytes, that if too much water is removed from the cathode structure, the membrane can dry out resulting in a significant decrease in the performance of the fuel cell.

Traditionally, the gas porous substrates used in PEMFC are based on high density materials such as rigid carbon fibre paper (i.e. Toray TGP-H-60 or TGP-H-90 from Toray Europe Ltd., 7 Old Park Lane, London, W1Y 4AD) or woven carbon cloths, such as Zoltek PWB-3 (Zoltek Corporation, 3101 McKelvey Road, St. Louis, Mo. 63044). Substrates such as these are usually modified with a particulate material embedded within the fibre network and often coated on to the surface. Typically these particulate materials comprise a carbon black and polymer mix (the polymer most frequently used being polytetrafluoroethylene, PTFE). The coating, or embedding, is carried out in order to improve the water management properties, to provide a continuous surface on which to apply the catalyst layer and to improve the electrical conductivity.

More recently, electrode structures based on a porous substrate comprising a non-woven network of carbon fibres (carbon fibre structures such as Optimat 203, from Technical Fibre Products, Kendal, Cumbria, UK) with a particulate material embedded within the fibre network as disclosed in EP-A-0 791 974 have shown comparable performances to structures based on carbon fibre paper or cloth. Electrodes based on non-woven materials of this type give a physically strong, dimensionally stable and handleable structure at a cost compatible with auto-motive power applications.

However, although these electrodes perform reasonably well under most conditions, they lack the flexibility to modify the water management characteristics, particularly when operating at high current densities. Control of this property is highly important to ensure the optimum functioning of the PEMFC which may operate under a range of conditions of, for example, temperature, pressure, reactant gas flow rates and reactant gas level of humidification.

Recent attempts have been made to improve the performance of gas diffusion electrodes by minimising all transport resistances occurring in the electrochemical reaction, by making appropriate changes in the electrode structure. For example, a method proposed is to include a pore-former to the catalyst mixture prior to being applied to the electrode substrate, and subsequent treatment of the electrode to remove the pore-forming material to leave pores. Such methods are proposed in Fuel Cells Bulletin, No 6, March 1999, page 6 and in EP-A-0797265. However, the introduction of a pore-former results in the need for an additional processing step, ie the subsequent removal of the pore-former, and therefore presents a disadvantage in terms of the manufacturing and total cost. Furthermore, complete removal of the pore-former would be required since the pore-former material itself may be deleterious to the performance of the electrode; it would be difficult to ensure complete removal and some form of analysis would be required to determine the extent to which the pore-former had been removed, thus further adding to the cost.

It is an object of the present invention to provide a porous substrate, suitable for use for example in a gas diffusion electrode, which retains good gas diffusion properties, but also has greatly improved water management properties.

SUMMARY OF THE INVENTION

Accordingly, the present invention provides a gas diffusion substrate comprising a porous structure and a filler material, characterised in that the filler material comprises (i) a base filler material which is electrically conducting and carbonaceous, and (ii) one or more modifier materials which are hydrophilic in nature relative to the base filler material (i). The base filler material forms the porous matrix for the purpose of providing suitable gas diffusion and electrical conductivity when employed as a gas diffusion substrate. The base filler also acts to retain the modifier material, or materials, which change the water management properties of the structure.

Suitably, the base filler material comprises a mixture of a particulate carbon and one or more polymers, the carbon suitably being in the form of a powder. The carbon powder may be any of the materials generally designated as carbon black such as acetylene blacks, furnace blacks, pitch, coke-based powders and graphitised versions of such materials. Suitably also both natural and synthetic graphites may be used in this application. Such materials may be used either alone or in combination. The particulate carbon, or carbons, in the base filler material are held together by one or more polymers. The polymeric materials used will contribute to the essential electrode structural properties such as pore size distribution, hydrophobic/hydrophilic balance and physical strength of the gas diffusion layer. It is preferable that the polymer is relatively hydrophobic thereby rendering the base filler material as a whole hydrophobic. Examples of such polymers include polytetrafluoroethylene (PTFE), fluorinated ethylene-propylene (FEP), polyvinylidene difluoride (PVDF), Viton A, polyethylene, polypropylene, ethylene-propylene. The preferred polymers are PTFE or FEP.

The base filler material may further comprise a catalyst other than an electrocatalyst, for example a gas phase catalyst which is designed to remove contaminant gases in the fuel or oxidant feed streams, as for example carbon monoxide in the hydrogen fuel, when this is supplied from a reformer.

The modifier material, or materials, are added to the base filler material in order to change the water management properties of the structure. One or more modifier materials are hydrophilic in nature relative to the base filler material. Preferably, the one or more modifier materials are based on carbon, glass, silica or ceramics, which may be hollow, porous or solid and are more preferably essentially spherical or fibrous materials. By the term essentially spherical, we mean that the modifier material may be spherical, spheroidal, ellipsoidal or any shape which approximates to a sphere, spheroid or ellipsoid. By the term fibrous, we mean that the modifier material is of a fibrous nature, ie its length is far greater than its width or diameter; in general the fibres would not be longer than approximately 3 mm. Specific examples of the modifier material include carbon wool, quartz wool, silica micro-fibres, blown ceramic fibres, carbon micro-spheres, glass micro-spheres, colloidal or fumed silica and zeolites.

The porous structure may be a woven or non-woven material or formed from a polymer. For example, the porous structure may be a rigid carbon fibre paper, such as Toray paper, a woven carbon cloth, such as Zoltek, or a non-woven carbon fibre structure, such as Optimat 203. Alternatively, the porous structure may be formed from a polymer, for example an expanded polymer mesh as described in WO98/27606.

The gas diffusion substrates of the invention may be prepared by taking a pre-formed porous structure and subsequently in-filling with the filler material. The majority of the filler material will be forced into the structure of the fibre structure, although a small quantity may remain on the surface. Alternatively, in the case of a non-woven fibre structure being used, the gas diffusion substrate may be prepared in a single step process by adapting a continuous manufacturing technique, for example paper making, or extrusion or pultrusion.

A second aspect of the invention provides a gas diffusion electrode comprising a gas diffusion substrate as hereinbefore described and an electrocatalyst material. The electrocatalyst material is applied as a thin layer to the surface of the gas diffusion substrate. Some of the electrocatalyst material may penetrate slightly into the substrate, the remaining material forming a layer on the surface of the substrate. The electrocatalyst material comprises one or more electrocatalytic components and a polymer. Suitable polymers include hydrophobic polymers, such as PTFE and/or proton conducting polymers, such as Nafion®. The electrocatalytic component is defined as a substance that promotes or enhances the rate of the electrochemical reaction of interest but remains unaltered by the reaction. The electrocatalytic component or components selected will depend on the application for which the gas diffusion electrode is being used. These may be, for example, a precious metal or a transition metal as the metal or metal oxide, either unsupported or supported in a dispersed form on a carbon support; a carbon or an organic complex, in the form of a high surface area finely divided powder or fibre, or a combination of these options. An example of a suitable electrocatalyst material is described in EP-A-0731520.

A third aspect of the invention provides a membrane electrode assembly comprising a gas diffusion electrode of the invention as hereinbefore defined and a second gas diffusion electrode which may or may not be an electrode according to the invention, and a solid polymer membrane, for example Nafion®. Alternatively, the invention provides a membrane electrode assembly comprising a gas diffusion electrode of the invention as hereinbefore defined, a gas diffusion substrate which may or may not be a substrate according to the invention and a solid polymer membrane, for example Nafion®, wherein an electrocatalyst layer is applied to the side of the membrane facing the gas diffusion substrate. Alternatively, the invention provides a membrane electrode assembly comprising a gas diffusion substrate of the invention as hereinbefore defined, a gas diffusion electrode which may or may not be an electrode according to the invention and a solid polymer membrane, for example Nafion®, wherein an electrocatalyst layer is applied to the side of the membrane facing the gas diffusion substrate. Alternatively, the invention provides a membrane electrode assembly comprising a gas diffusion substrate of the invention as hereinbefore defined and a second gas diffusion substrate which may or may not be a substrate according to the invention, and a solid polymer membrane, for example Nafion®, wherein an electrocatalyst layer is applied to both sides of the solid polymer membrane.

A still further aspect of the invention provides a fuel cell comprising a gas diffusion substrate according to the present invention. A further aspect provides a fuel cell comprising a gas diffusion electrode according to the present invention.

BRIEF DESCRIPTION OF THE DRAWING

The invention will now be further described with reference to FIG. 1 and to the following Examples (according to the invention) and Comparative Examples (not according to the invention).

DETAILED DESCRIPTION OF THE INVENTION

Figure 1:
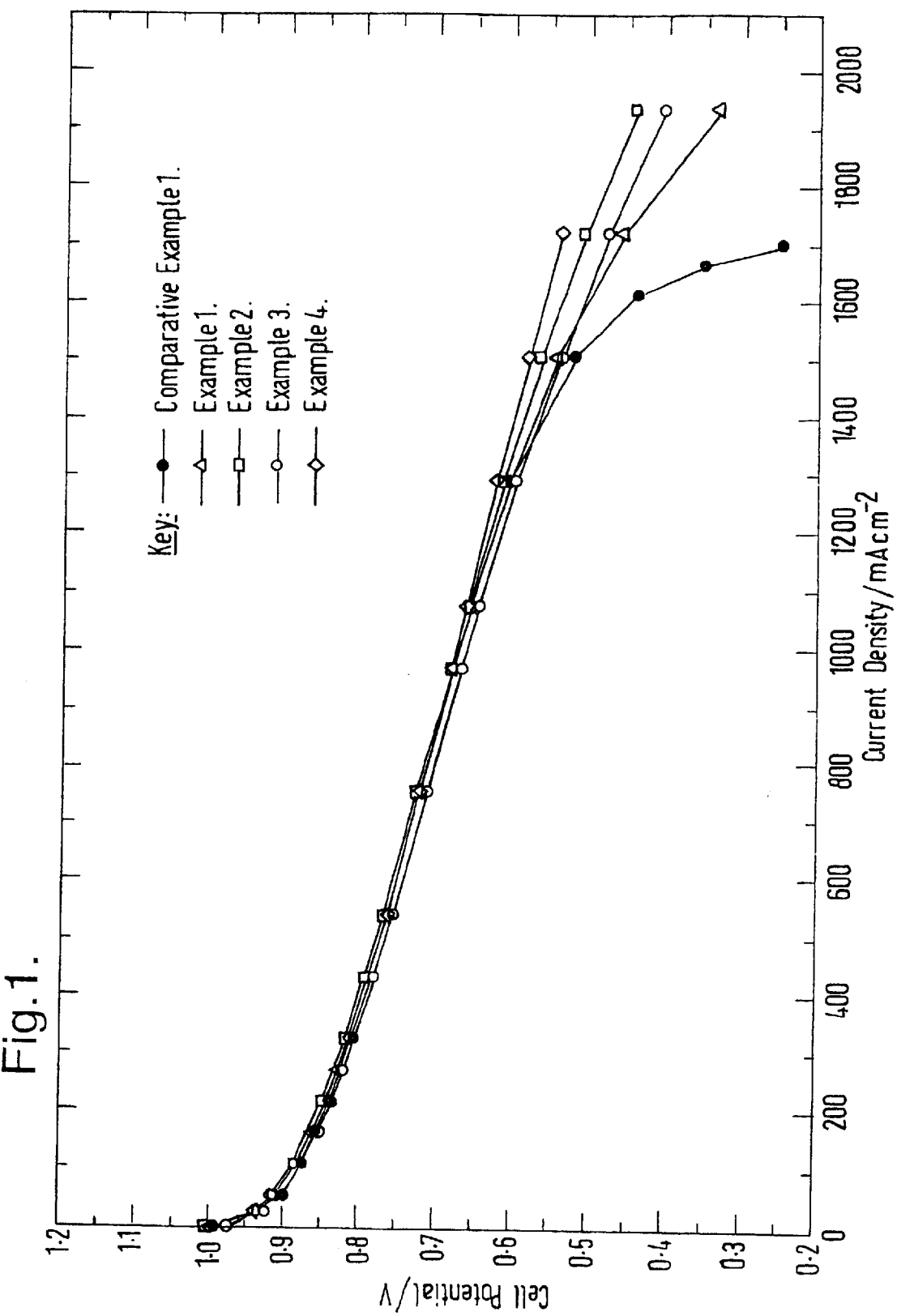

The materials of the invention can be employed as either the anode or cathode, or indeed both anode and cathode in the electrochemical cells of the specific application. In the following examples, the electrodes are incorporated as the cathode in membrane electrode assemblies (MEAs) and evaluated in a proton exchange membrane fuel cell, with hydrogen as the anode fuel and air or pure oxygen as the cathode oxidant. It is at the cathode that the majority of cell performance (voltage) losses occur in cells operating with hydrogen as the fuel. The MEAs were fabricated by hot pressing the anode and cathode against each face of the solid proton conducting electrolyte membrane as is commonly practised in the art.

The anodes were of the more conventional type, currently widely employed in the PEMFC. They comprised a convention pre-teflonated rigid conducting carbon fibre paper substrate (Toray TGP-H-090) to which was applied a layer of a 20 wt % platinum, 10 wt % ruthenium catalyst, supported on Cabot Vulcan XC72R (from Johnson Matthey Inc., New Jersey, USA), at an electrode platinum loading of 0.25 mg/cm$^2$ of electrode geometric area. The MEAs were evaluated in a PEMFC single cell, with a geometric electrochemically active area of 240 cm$^2$. The single cell consisted of graphite plates into which flow-fields were machined to distribute reactant gases and humidification water, and remove products. The MEA was located between the flow-field plates. The operation of the single cell was controlled from a purpose built test station facility. The performance of the fuel cell was assessed by measuring the voltage and current density relationship using a standard operating procedure. Unless otherwise stated, these conditions were typically, a reactant gas inlet temperature of 80° C., a pressure of both anode and cathode reactant gases of 3 atmosphere, and a reactant stoichiometry of 1.5 for hydrogen and 10.0 for oxygen.

COMPARATIVE EXAMPLE 1

Not According to the Invention

A pre-formed non-woven carbon fibre structure having a density of 17 g/m$^2$ (equivalent to 0.07 g/cm$^3$) (Optimat 203, Technical Fibre Products, Kendal, Cumbria, UK), was pre-coated with PTFE by soaking the cloth for 1 minute in a solution of 20 parts by weight of PTFE emulsion (ICI Fluon dispersion GP1) in 500 parts by weight of water then draining and allowing to dry. The coated carbon fibre paper was heated to 350° C. in air to sinter the PTFE.

The particulate material (the base filler material) used for embedding within the fibre network was provided by dispersing 47 weight parts of acetylene black (Shawinigan black from Chevron Chemicals, Houston, Tex., USA) in 1200 parts of water. To this was added 3 weight parts of polytetrafluoroethylene (PTFE) as a dispersion in water (ICI Fluon dispersion GP1, 64 wt % solids suspension) and the mixture stirred to entrain the PTFE particles within the carbon black. The resultant material was dispersed using a high shear mixer (Silverson L4R) to produce a smooth mixture.

The particulate material was pressed into the non-woven carbon fibre structure from one side, and levelled off using a metal edge. The sheet was then dried at 200° C. for 1 minute. A further thin layer of the particulate material was applied to the same side; the structure was sandwiched between two sheets of filter paper and passed through a set of rollers to compact the layer. The sheet was then dried at 200° C. for 1 minute. This process was then repeated for the second side. Further additions of thin layers of the particulate material were applied to each side with compaction and drying until a loading of 3.3 mg/cm$^2$ of carbon was achieved. The resulting gas diffusion substrate sheet was fired, in air, to 300° C. for 30 minutes.

A catalyst material used for forming the electrocatalyst layer on the gas diffusion substrate was provided by dispersing 100 weight parts of a 40 weight % platinum on carbon black (Johnson Matthey FC40) in 30 parts of Nafion®EW1100 (E I DuPont De Nemours & Co.) as a 9.5 weight % dispersion in water, according to methods described in EP-A-0731 520. The particulate catalyst was dispersed using a high shear mixer (Silverson L4R) to produce a smooth ink.

A layer of the catalyst material was then applied to the top face of the filled non-woven gas diffusion substrate, to give a loading of 0.71 mg of platinum/cm$^2$. The electrode formed the cathode of an MEA, with the platinum electrocatalyst layer bonded to the membrane electrolyte face. The membrane employed was DuPont Nafion® 112. The performance of a single cell operating with oxygen is shown in FIG. 1.

EXAMPLE 1

A preformed non-woven carbon fibre structure having a density of 17 g/m$^2$ (equivalent to 0.07 g/cm$^3$) (Optimat 203, Technical Fibre Products, Kendal, Cumbria, UK), was pre-coated with PTFE by passing the material, as a continuous web, through a bath containing a recirculated solution of 20 parts by weight of PTFE emulsion (ICI Fluon dispersion GP1, 61% solids) in 350 parts by weight of water. The web was drained of excess water and dried at 150° C. in a tunnel oven. The coated carbon fibre paper was heated to 385° C. in air, in a tunnel oven, to sinter the PTFE.

The particulate material (the base filler material) used for embedding within the fibre network was provided by dispersing 84 weight parts of acetylene black (Shawinigan black from Chevron Chemicals, Houston, Tex., USA) in 2500 parts of water. To this was added 6 weight parts of polytetrafluoroethylene (PTFE) as a dispersion in water (ICI Fluon dispersion GP1, 64 wt % solids suspension) and the mixture stirred, and heated to entrain the PTFE particles within the carbon black. To the resultant flocculated material was added 10 weight parts of Eccosphere® glass microspheres, (grade SDT-60, New Metals & Chemicals Ltd., Waltham Abbey, Essex, UK) and dispersed using a paddle blade mixer to produce a smooth slurry.

Using the procedure outlined in Comparative Example 1, the modified particulate filler material (described above) was embedded within a sheet of the teflonated, non-woven carbon fibre material prepared as a continuous web, to give a carbon loading of 4.7 mg/cm$^2$.

A catalyst material used for forming the electrocatalyst layer on the gas diffusion substrate was provided as in Comparative Example 1.

A layer of the electrocatalyst material was then applied to the top face of the filled non-woven gas diffusion substrate, to give a loading of 0.63 mg of platinum/cm$^2$.

The electrode formed the cathode of an MEA, with the platinum catalyst layer bonded to the membrane electrolyte face. The membrane employed was DuPont Nafion® 112. The result from testing in a single cell with oxygen is shown in FIG. 1.

EXAMPLE 2

The particulate material (the base filler material) used for embedding within the fibre network was provided by dispersing 84 weight parts of acetylene black (Shawinigan black from Chevron Chemicals, Houston, Tex., USA) in 2500 parts of water. To this was added 6 weight parts of polytetrafluoroethylene (PTFE) as a dispersion in water (ICI Fluon dispersion GP1, 64 wt % solids suspension) and the mixture stirred, and heated to entrain the PTFE particles within the carbon black. To the resultant flocculated material was added 10 weight parts of silica microfibre (type Q-106 from Johns Manville, Denver, Colo., USA) dispersed using a paddle blade mixer to produce a smooth slurry.

Using the procedure outlined in Comparative Example 1, the modified particulate filler material (described above) was embedded within a sheet of the teflonated, non-woven carbon fibre material prepared as a continuous web as in Example 1, to give a carbon loading of 4.6 mg/cm$^2$.

A catalyst material used for forming the electrocatalyst layer on the gas diffusion substrate was provided as in Comparative Example 1.

A layer of the electrocatalyst material was then applied to the top face of the filled non-woven gas diffusion substrate, to give a loading of 0.59 mg of platinum/cm$^2$.

The electrode formed the cathode of an MEA, with the platinum catalyst layer bonded to the membrane electrolyte face. The membrane employed was DuPont Nafion® 112. The result from testing in a single cell with oxygen is shown in FIG. 1.

EXAMPLE 3

The particulate material (the base filler material) used for embedding within the fibre network was provided by dispersing 74 weight parts of acetylene black (Shawinigan black from Chevron Chemicals, Houston, Tex., USA) in 2500 parts of water. To this was added 6 weight parts of polytetrafluoroethylene (PTFE) as a dispersion in water (ICI Fluon dispersion GP1, 64 wt % solids suspension) and the mixture stirred, and heated to entrain the PTFE particles within the carbon black. To the resultant flocculated material was added 20 weight parts of carbon fibre wool (type FRC 15 from Le Carbone, Portslade, Sussex, UK) and dispersed using a paddle blade mixer to produce a smooth slurry.

Using the procedure outlined in Comparative Example 1, the modified particulate filler material (described above) was embedded within a sheet of the teflonated, non-woven carbon fibre material prepared as a continuous web as in Example 1, to give a carbon loading of 4.8 mg/cm$^2$.

A catalyst material used for forming the electrocatalyst layer on the gas diffusion substrate was provided as in Comparative Example 1.

A layer of the electrocatalyst material was then applied to the top face of the filled non-woven gas diffusion substrate, to give a loading of 0.62 mg of platinum/cm$^2$.

The electrode formed the cathode of an MEA, with the platinum catalyst layer bonded to the membrane electrolyte face. The membrane employed was DuPont Nafion® 112. The result from testing in a single cell with oxygen is shown in FIG. 1.

EXAMPLE 4

The particulate material (the "base filler material") used for embedding within the fibre network was provided by dispersing 84 weight parts of acetylene black (Shawinigan black from Chevron Chemicals, Houston, Tex., USA) in 2500 parts of water. To this was added 6 weight parts of polytetrafluoroethylene (PTFE) as a dispersion in water (ICI Fluon® dispersion GP1, 64 wt % solids suspension) and the mixture stirred, and heated to entrain the PTFE particles within the carbon black. To the resultant flocculated material was added 10 weight parts of Ketjenblack carbon black (type EC300J KLB from Akzo Nobel, Walton-on-Thames, Surrey, UK) and dispersed using a paddle blade mixer to produce a smooth slurry.

Using the procedure outlined in Comparative Example 1 the modified particulate filler material (described above) was embedded within a sheet of the teflonated, non-woven carbon fibre material prepared as a continuous web as in Example 1, to give a carbon loading of 4.46 mg/cm$^2$.

A catalyst material used for forming the electrocatalyst layer on the gas diffusion substrate was provided as in Comparative Example 1.

A layer of the electrocatalyst material was then applied to the top face of the filled non-woven gas diffusion substrate, to give a loading of 0.89 mg of platinum/cm$^2$.

The electrode formed the cathode of an MEA, with the platinum catalyst layer bonded to the membrane electrolyte face. The membrane employed was DuPont Nafion® 112. The results from testing in a single cell with oxygen are shown in FIG. 1.

The cell potential versus current density performance of Comparative Example 1, shown in FIG. 1, is typical of the hydrogen/oxygen performance of an electrode produced by filling a non-woven carbon fibre web with base filler material. The gas diffusion properties of such substrates are very good, with the fall off in $H_2/O_2$ performance above 1200 mA/cm$^2$ being due to the structures' inability to retain sufficient water to maintain optimum hydration of the membrane, rather than restricted oxygen mass transport in the cathode, when operating at high current densities. This poorer membrane hydration causes an increased ohmic drop over the membrane and a resultant lower cell potential at a given current density.

The incorporation of modifier materials into the base filler material used in conventional non-woven carbon structures, overcomes the problems of water retention in the membrane and maintains membrane hydration out to higher current densities. This improves performance at higher current densities as shown by the relative performance of Comparative Example 1 and Examples 1, 2, 3 and 4 in FIG. 1.

What is claimed is:

1. A gas diffusion substrate comprising a porous structure and a filler material, characterised in that the filler material comprises (i) a base filler material which is electrically conducting and carbonaceous and (ii) one or more modifier materials which are hydrophilic in nature relative to the base filler material (i).

2. A gas diffusion substrate according to claim 1, wherein the one or more modifier materials change the water management properties of the structure.

3. A gas diffusion substrate according to claim 1, wherein the one or more modifier materials are essentially spherical or fibrous materials based on carbon, glass, silica or ceramics.

4. A gas diffusion substrate according to claim 1, wherein the one or more modified materials are essentially spherical or fibrous.

5. A gas diffusion substrate according to claim 1, wherein the one or more modifier materials are selected from the group consisting of carbon wool or carbon micro-spheres.

6. A gas diffusion substrate according to claim 1, wherein the one or more modifier material are glass micro-spheres.

7. A gas diffusion substrate according to claim 1, wherein the one or more modifier materials are selected from the group consisting of quartz wool, silica micro-fibres, and colloidal or fumed silica.

8. A gas diffusion substrate according to claim 1, wherein the one or more modifier materials are blown ceramic fibres.

9. A gas diffusion substrate according to claim 1, wherein the one or more modifier materials are zeolites.

10. A gas diffusion substrate according to claim 1, which comprises two or more modifier materials selected from the group consisting of carbon wool, carbon micro-spheres, glass micro-spheres, quartz wool, silica micro-fibres, colloidal or fumed silica, blown ceramic fibres and zeolites.

11. A gas diffusion substrate according to claim 1, wherein the porous structure is a woven or non-woven material or is formed from an extruded polymer.

12. A gas diffusion substrate according to claim 1, wherein the base filler material comprises a mixture of particulate carbon and one or more polymers.

13. A gas diffusion substrate according to claim 1, wherein the base filler material further comprises a catalyst, other than an electrocatalyst.

14. A gas diffusion electrode comprising a gas diffusion substrate as claimed in claim 1, and an electrocatalyst material.

15. A gas diffusion electrode according to claim 14, wherein the electrocatalyst material comprises one or more electrocatalytic components and a polymer.

16. A gas diffusion electrode according to claim 15, wherein the electrocatalytic component is a precious metal or a transition metal as the metal or metal oxide, either unsupported or supported in a dispersed form on a carbon support; a carbon or an organic complex, in the form of a high surface area finely divided powder or fibre, or a combination of these options.

17. A membrane electrode assembly comprising a first gas diffusion electrode as claimed in claim 14, a second gas diffusion electrode which may or may not be an electrode as claimed in claim 14, and a solid polymer membrane.

18. A membrane electrode assembly comprising a gas diffusion electrode as claimed in claim 14, a gas diffusion substrate and a solid polymer membrane, wherein an electrocatalyst layer is applied to the side of the membrane facing the gas diffusion substrate.

19. A fuel cell comprising a gas diffusion electrode as claimed in claim 14.

20. A membrane electrode assembly comprising a first gas diffusion substrate as claimed in claim 1, and a second gas diffusion substrate which may or may not be a substrate as claimed in claim 1, and a solid polymer membrane, wherein an electrocatalyst layer is applied to both sides of the solid polymer membrane.

21. A fuel cell comprising a gas diffusion substrate as claimed in claim 1.

22. A membrane electrode assembly comprising a gas diffusion substrate comprising: a porous structure and a filler material comprising (i) a base filler material which is electrically conducting and carbonaceous and (ii) one or more modifier materials which are hydrophilic in nature relative to the base filler material (i); a gas diffusion electrode; and a solid polymer membrane, wherein an electrocatalyst layer is applied to the side of the membrane facing the gas diffusion substrate.

23. A membrane electrode assembly according to claim 22, wherein said gas diffusion electrode comprises an electrocatalyst material and a second gas diffusion substrate comprising a second porous structure and the filler material comprising (i) the base filler material which is electrically conducting and carbonaceous and (ii) one or more modifier materials which are hydrophilic in nature relative to the base filler material (i).

* * * * *